US010934748B2

(12) United States Patent
Harajli et al.

(10) Patent No.: US 10,934,748 B2
(45) **Date of Patent: *Mar. 2, 2021**

(54) DOOR ACTUATOR WITH RETRACTION DEVICE

(71) Applicant: Ford Global Technologies, LLC, Dearborn, MI (US)

(72) Inventors: Asaa Yehia Harajli, Dearborn, MI (US); Jonathan Paul Weiler, Detroit, MI (US); Howard Paul Tsvi Linden, Southfield, MI (US); David Darius Wooten, Redford, MI (US); Onoyom Essien Ekanem, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,400

(22) Filed: Mar. 17, 2020

(65) Prior Publication Data

US 2020/0217107 A1 Jul. 9, 2020

Related U.S. Application Data

(62) Division of application No. 15/860,101, filed on Jan. 2, 2018, now Pat. No. 10,633,893.

(51) Int. Cl.
*B60J 1/16* (2006.01)
*E05B 81/20* (2014.01)
(Continued)

(52) U.S. Cl.
CPC .............. *E05B 81/20* (2013.01); *E05F 15/60* (2015.01); *E05F 15/616* (2015.01); *E05B 81/14* (2013.01);
(Continued)

(58) Field of Classification Search
CPC .... E05B 81/20; E05F 15/60; E05Y 2900/531; E05Y 2201/426; E05Y 2201/22; E05Y 2201/232; E05Y 2201/462
(Continued)

(56) References Cited

U.S. PATENT DOCUMENTS 2,553,023 A 5/1951 Walters
3,451,702 A 6/1969 Little
(Continued)

FOREIGN PATENT DOCUMENTS

FR 2526996 B3 2/1985
JP 2016011053 A 1/2016
(Continued)

*Primary Examiner* — Jerry E Redman
(74) *Attorney, Agent, or Firm* — David Coppiellie; Price Heneveld LLP

(57) ABSTRACT

A vehicle door apparatus is disclosed. The apparatus comprises a door configured to be pivotably mounted to a body structure of a vehicle and a door locator mechanism. The door locator mechanism comprises a plunger and a retraction device. The plunger is configured to be actuated between extended and retracted positions. The retraction device is disposed on the plunger and configured to engage the body structure magnetically. The apparatus further comprises a controller configured to withdraw the plunger to the retracted position while activating the retraction device electromagnetically connecting the plunger to the door.

20 Claims, 10 Drawing Sheets

(51) Int. Cl.
*E05F 15/60* (2015.01)
*E05F 15/616* (2015.01)
*E05B 81/14* (2014.01)

(52) U.S. Cl.
CPC ..... *E05Y 2201/22* (2013.01); *E05Y 2201/232* (2013.01); *E05Y 2201/412* (2013.01); *E05Y 2201/426* (2013.01); *E05Y 2201/462* (2013.01); *E05Y 2800/11* (2013.01); *E05Y 2900/531* (2013.01)

(58) Field of Classification Search
USPC ........................................................... 49/273
See application file for complete search history.

(56) References Cited

U.S. PATENT DOCUMENTS

| | | | | |
|---|---|---|---|---|
| 3,605,459 | A * | 9/1971 | Van Dalen | E05B 47/0038 70/144 |
| 5,092,637 | A | 3/1992 | Miller | |
| 5,998,746 | A | 12/1999 | Clark | |
| 6,338,536 | B1 | 1/2002 | Ueno et al. | |
| 6,357,803 | B1 | 3/2002 | Lorek | |
| 7,204,530 | B2 | 4/2007 | Lee | |
| 7,688,179 | B2 | 3/2010 | Kurpinski et al. | |
| 8,584,402 | B2 * | 11/2013 | Yamaguchi | E05F 1/14 49/379 |
| 8,739,468 | B2 | 6/2014 | Yamaguchi et al. | |
| 8,915,524 | B2 | 12/2014 | Charnesky et al. | |
| 9,000,901 | B2 | 4/2015 | McKee et al. | |
| 9,003,707 | B2 * | 4/2015 | Reddmann | E05F 15/60 49/278 |
| 9,062,478 | B2 | 6/2015 | Bingle et al. | |
| 9,382,741 | B2 | 7/2016 | Konchan et al. | |
| 9,518,408 | B1 | 12/2016 | Krishman | |
| 9,551,166 | B2 | 1/2017 | Patel et al. | |
| 9,725,069 | B2 | 8/2017 | Krishnan | |
| 9,834,964 | B2 | 12/2017 | Van Wiemeersch et al. | |
| 9,845,071 | B1 * | 12/2017 | Krishnan | B60R 25/24 |
| 9,909,344 | B2 | 3/2018 | Krishnan et al. | |
| 9,995,066 | B1 | 6/2018 | Ottolini et al. | |
| 10,087,671 | B2 | 10/2018 | Linden et al. | |
| 10,119,308 | B2 | 11/2018 | Linden et al. | |
| 10,227,810 | B2 * | 3/2019 | Linden | E05F 15/611 |
| 10,316,553 | B2 | 6/2019 | Krishnan et al. | |
| 10,323,442 | B2 * | 6/2019 | Kleve | E05B 77/54 |
| 10,329,823 | B2 | 6/2019 | Khan et al. | |
| 10,392,849 | B2 | 8/2019 | Xiao et al. | |
| 10,458,171 | B2 | 10/2019 | Khan et al. | |
| 10,633,893 | B2 * | 4/2020 | Harajli | E05F 15/60 |
| 2008/0296927 | A1 * | 12/2008 | Gisler | E05F 15/43 296/146.4 |
| 2015/0240548 | A1 * | 8/2015 | Bendel | E05C 17/003 701/49 |
| 2015/0330112 | A1 * | 11/2015 | Van Wiemeersch | E05B 81/76 292/201 |
| 2015/0330133 | A1 * | 11/2015 | Konchan | E05B 81/76 296/146.4 |
| 2016/0060909 | A1 * | 3/2016 | Krishnan | E05B 81/82 292/194 |
| 2016/0369551 | A1 | 12/2016 | Suzuki et al. | |
| 2018/0038147 | A1 * | 2/2018 | Linden | E05B 81/14 |
| 2018/0058128 | A1 * | 3/2018 | Khan | E05F 15/611 |
| 2018/0080270 | A1 * | 3/2018 | Khan | E05F 15/611 |
| 2018/0106081 | A1 | 4/2018 | Bendel | |
| 2019/0203508 | A1 | 7/2019 | Harajli et al. | |

FOREIGN PATENT DOCUMENTS

| | | | |
|---|---|---|---|
| WO | 2016031162 | A1 | 3/2016 |
| WO | 20170160787 | A1 | 9/2017 |

* cited by examiner

DOOR ACTUATOR WITH RETRACTION DEVICE

CROSS-REFERENCE TO RELATED APPLICATIONS

This application is a divisional of U.S. application Ser. No. 15/860,101 entitled Door Actuator with Retraction Device, filed on Jan. 2, 2018, by Harajli et al., now U.S. Pat. No. 10,633,893, the entire disclosure of which is incorporated herein by reference.

FIELD OF THE INVENTION

The present invention generally relates to vehicle doors, and more particularly to vehicle doors having powered latch mechanisms.

BACKGROUND OF THE INVENTION

Powered door latch mechanisms may be implemented in modern vehicles. Such mechanisms may include a variety of locking or actuating mechanisms to improve vehicle accessibility. The disclosure provides for systems and devices for use in combination with powered latch mechanisms as provided by the following detailed description.

SUMMARY OF THE INVENTION

In one aspect of the present disclosure, an apparatus for positioning a vehicle door apparatus is disclosed. The apparatus comprises a door configured to be pivotably mounted to a body structure of a vehicle and a door locator mechanism. The door locator mechanism comprises a plunger and a retraction device. The plunger is configured to be actuated between extended and retracted positions. The retraction device is disposed on the plunger and configured to engage the body structure magnetically. The apparatus further comprises a controller configured to withdraw the plunger to the retracted position while activating the retraction device electromagnetically connecting the plunger to the door.

In another aspect of the present disclosure, a method for controlling a position of a vehicle door is disclosed. The method comprises rotating a door about a hinge assembly and extending a plunger from the door toward a body structure of the vehicle. The method further comprises activating an electromagnetic mechanism disposed on an end portion of the plunger magnetically connecting the plunger to the body structure. With the end portion magnetically connected to the body structure, the method continues by drawing the door toward the body structure by retracting the plunger thereby at least partially closing the vehicle door.

In yet another aspect of the present disclosure, an apparatus for positioning a vehicle door is disclosed. The apparatus comprises a door comprising a proximal end portion and a distal end portion. The door is pivotably mounted to a body structure of a vehicle at the proximal end portion. The apparatus further comprises a door locator mechanism. The door locator mechanism comprises a plunger configured to be actuated between extended and retracted positions and a retraction device disposed on the plunger. The retraction device is configured to engage the body structure magnetically. The apparatus further comprises a powered latch mechanism disposed on the distal end portion of the door opposite the hinge assembly and a controller. The controller is configured to activate the retraction device electromagnetically connecting the plunger to the door and withdraw the plunger from the extended position to the retracted position while the retraction device is activated thereby closing the door to an at least partially ajar position. The controller is further configured to control the powered latch mechanism engaging a bolt connected to the body structure thereby closing the door from the at least partially ajar position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
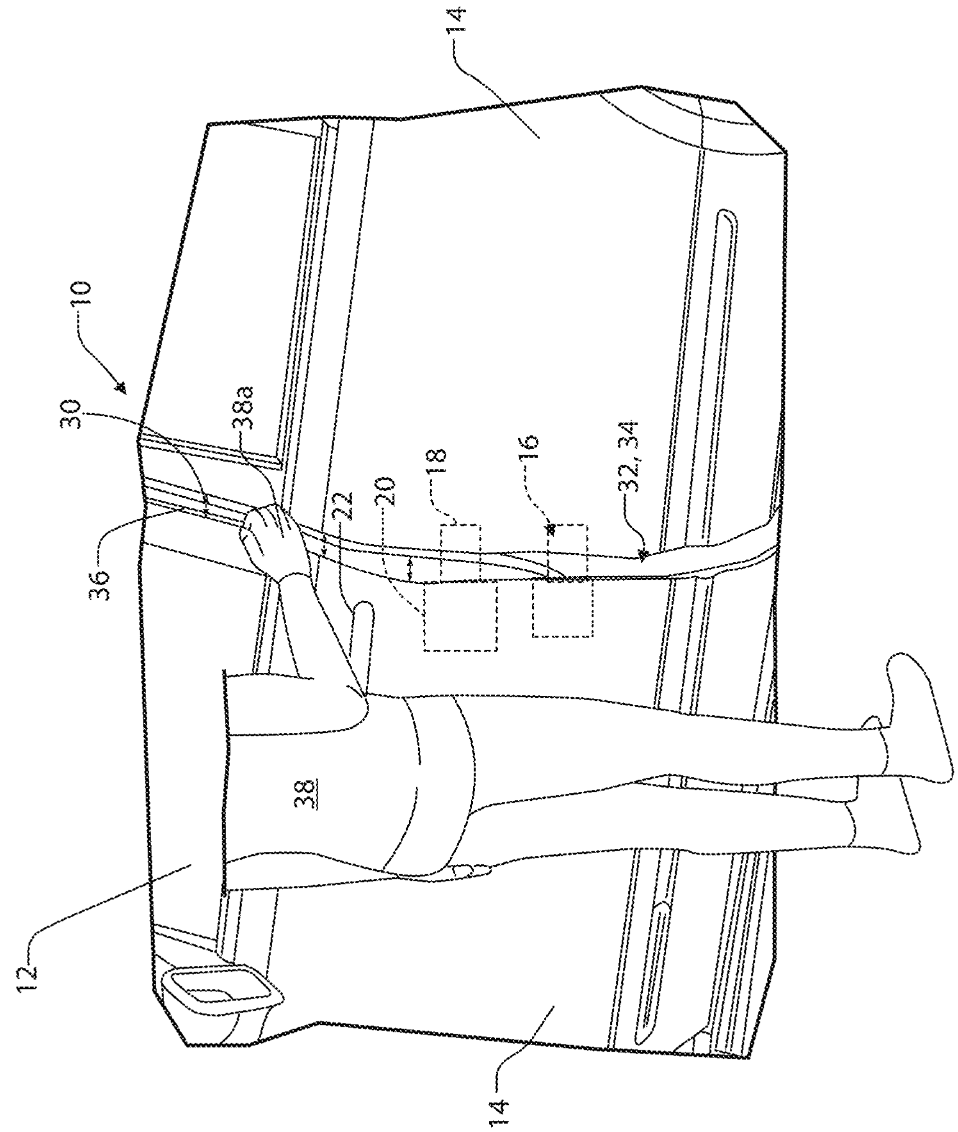
FIG. 1 is a partial isometric view of a vehicle door in a closed position.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
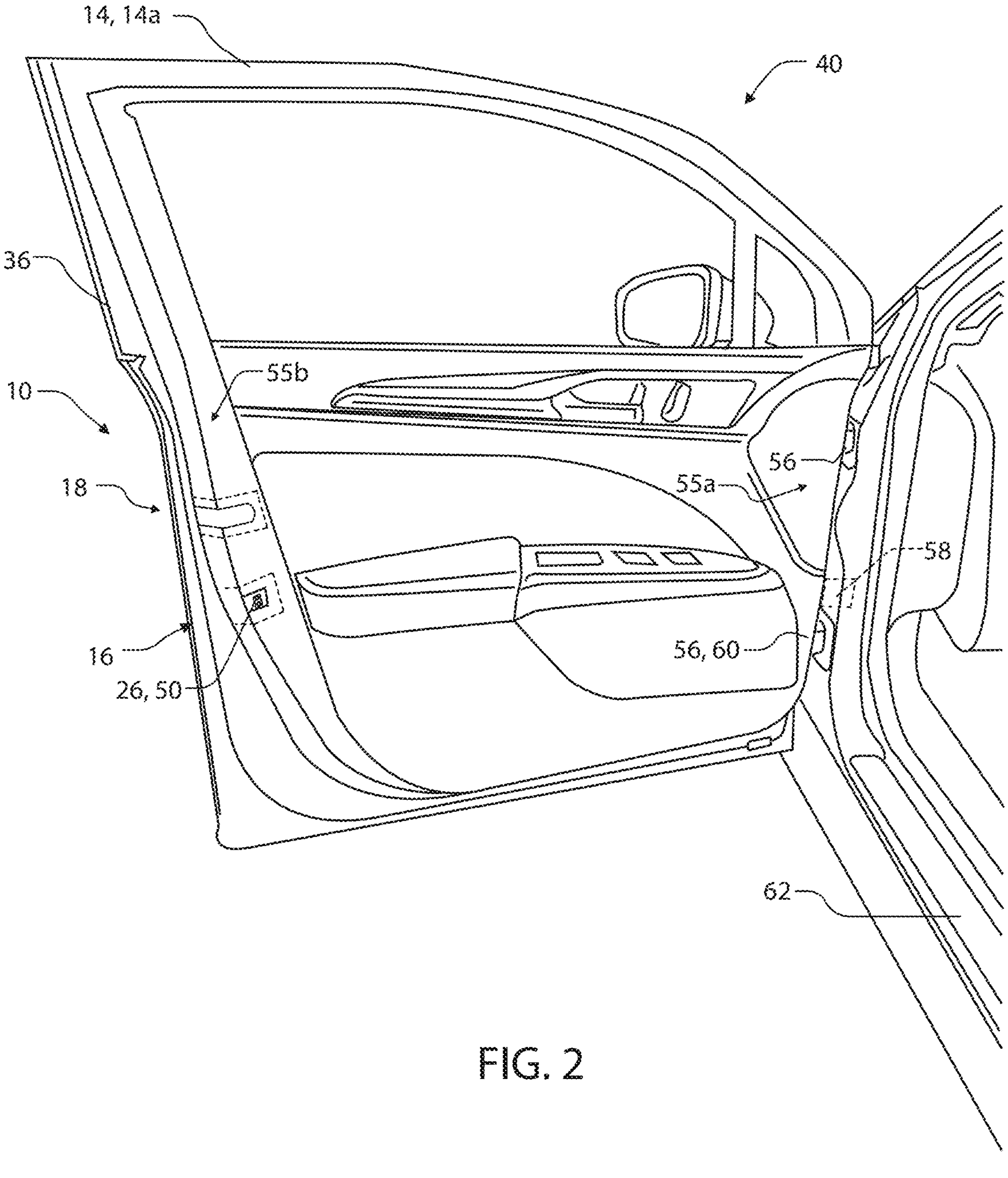
FIG. 2 is a partial isometric view of a vehicle door in a partially opened position.

Referring to FIGS. 1 and 2, a door control system 10 for a motor vehicle 12 is shown. The system 10 may be incorporated in the vehicle 12 and configured to control a plurality of passenger doors 14 (e.g. front door and rear door). One or more of the vehicle doors 14 may include a powered door locator mechanism 16. As discussed in more detail below, door 14 may also include a powered latch mechanism 18 having a controller 20. As demonstrated in further detail in FIG. 9, a control switch 22 may be operably connected to the controller 20 and may be configured to initiate a control routine of the door 14. Though demonstrated disposed on the door 14_a_, the control switch 22 may be located on various portions of the vehicle 12. The control switch 22 may comprise a conventional movable switch member, a touch sensor, or a capacitive sensor. Additionally, the control switch 22 may correspond to a remote control device 24 (e.g. a key fob, mobile device, etc.) configured to wirelessly communicate with the controller 20 of the door control system 10 to initiate the control routine.

Figure 10:
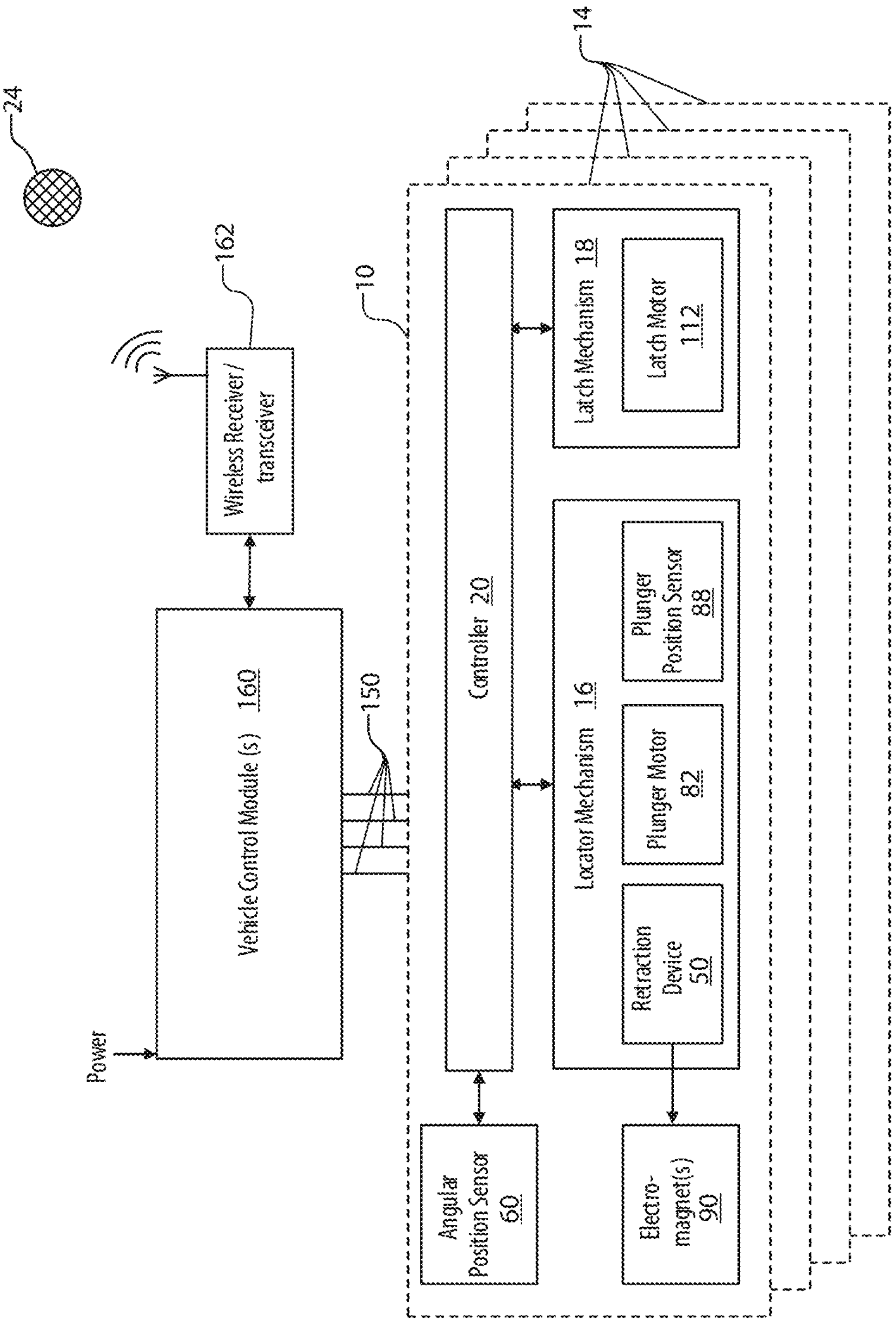
FIG. 10 is a block diagram of a control system for a door presenter and powered latch mechanism in accordance with the disclosure.

As discussed in more detail in reference to FIGS. 1-8, the controller 20 may control the locator mechanism 16 and the powered latch mechanism 18 to complete a door control routine in response to an actuation of the control switch 22 or the remote control device 24 (shown in FIG. 10). During the routine, the controller 20 may release the door 14 from a latched or locked position. Once the door 14 is released, the controller 20 may control the locator mechanism 16 to actuate a plunger 26 configured to apply force to the door 10 such that a position of the door 14 is adjusted to a first ajar position 28*a* or presented position. In the first ajar position 28*a*, a gap 30 may be formed between the door 14 and a corresponding portion of the body of the vehicle 12 (e.g a pillar 32 or wall). The gap 30 may expose a portion of a door jamb 34. From the first ajar position 28*a*, a perimeter edge 36 of the door 14 may be accessible to a user 38. As shown in FIG. 1, the user 38 may engage the perimeter edge 36 of the door 14 and adjust the door 14 to an open position or entry position 40. An example of the entry position 40 is shown in FIG. 2. Though discussed in reference to the particular examples shown in FIG. 2, the entry position 40 may correspond to any position, wherein an angular position of the door 14 is open in excess of the first ajar position 28*a*.

In some instances, the door control system 10 may position the door 14 in the first ajar position 28*a*, but not be accessed by the user 38. Under such circumstances without intervention, the door 14 may remain in the first ajar position 28*a* until the user 38, or another potentially unauthorized individual, accesses the vehicle 12. In order to avoid the door 14 remaining in the first ajar position 28*a*, the door control system 10 may further comprise a retraction device 50. The retraction device 50 may be configured to retrieve and reposition the door 14 from the first ajar position 28*a* to a second ajar position 28*b* shown in FIGS. 6 and 7. From the second ajar position 28*b*, the powered latch mechanism 18 may secure the door 14 to the pillar 32 via a bar 52 or striker plate. The powered latch mechanism 18 may secure the door 14 by controlling a cinching plate 54 configured to rotatably engage the bar 52 and position the door 14 in a closed position or sealed position.

As shown in the figures, the first ajar position 28*a* may correspond to a larger opening between the door 14 and a body 62 of the vehicle 12 than the second ajar position 28*b*. That is, the second ajar position 28*b* may be closer to a completely closed position or sealed position of the door 14 than the first ajar position 28*a*. In reference to the ajar positions, the terms first and second are merely intended to provide clarity. Accordingly, the terms "first," "second," etc., shall not be considered limiting to a specific number or priority of the elements discussed herein unless expressly stated otherwise.

Referring again to FIG. 2, the door control system 10 may be configured to control the position of one or more doors 14 of the vehicle 12. A proximal end portion 55*a* of each of the doors 14 may be mounted to the vehicle 12 via a hinge assembly 56. The locator mechanism 16 and the latch mechanism 18 may be in connection with a distal end portion 55*b* of each door 14 opposite the hinge assembly 56. Accordingly, each of the doors 14 may rotate about the hinge assembly 56 from the closed position to the entry position 40. In order to identify the angular orientation of each door 14 about the hinge assembly 56, the controller 20 may be in communication with an angular position sensor 60 (e.g. a Hall Effect sensor, potentiometer, etc.). The position sensor 60 may communicate a signal indicating the angular position of the door 14 relative to the body 62 of the vehicle 12.

Figure 4:
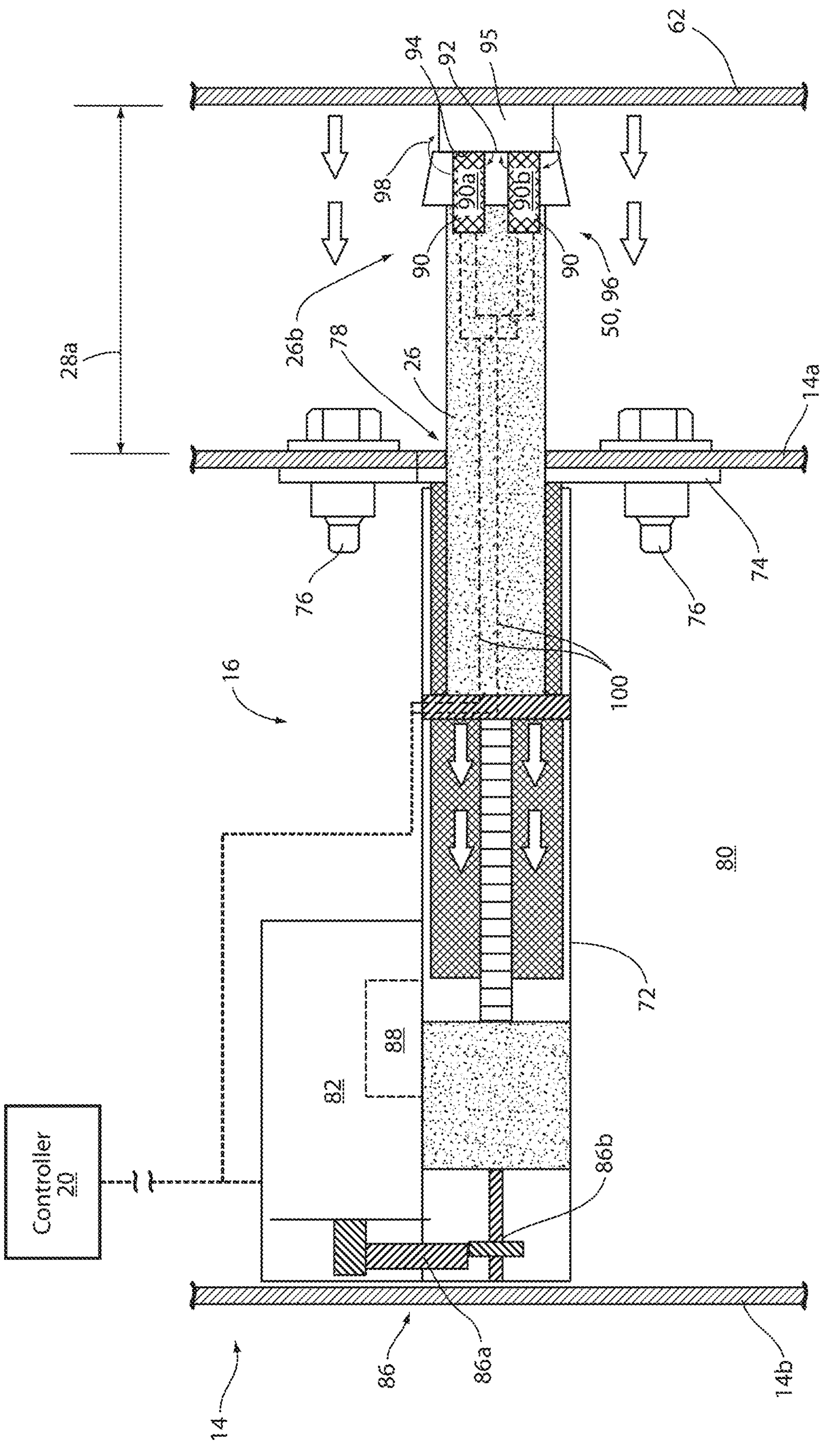
FIG. 4 is a cross-sectional view of a powered door presenter mechanism showing a plunger in an extended position.

In order to retain the door in the first ajar position 28*a*, the hinge assembly 56 may comprise a check mechanism 58 or detent that tends to retain the door 14 in the first ajar position 28*a* or in a first check position. The check mechanism 58 may be similar to conventional door check mechanisms and may comprise a spring biased assembly configured to retain the door 14 in one or more predetermined angular orientations about the hinge assembly 56. In this configuration, the door 14 may tend to remain stationary at a check or detent position. However, if the user 38 or the door control system 10 applies sufficient force to the door 14, the door 14 may be moved in opening or closing directions away from the detent. The check mechanism 58 may have a check or detent position that corresponds to a fully extended 26*b* position of plunger 26 (FIG. 4). Thus, the check mechanism 58 tends to retain door 14 in the first ajar position 28*a* corresponding to the position shown in FIG. 4.

Referring now to FIGS. 3-6, an exemplary embodiment of the locator mechanism 16 is shown. The locator mechanism 16 may comprise a housing 72 and a mounting bracket 74 or plate. The locator mechanism 16 may be mounted to an inner side 14*a* of the door 14 by one or more fasteners 76. In this configuration, the locator mechanism 16 may extend through openings 78 in the bracket 74. When installed, the locator mechanism 16 is disposed in an interior space 80 formed by the door 14. The interior space 80 is defined between an outer side 14*b* and the inner side 14*a* of the door 14.

Figure 6:
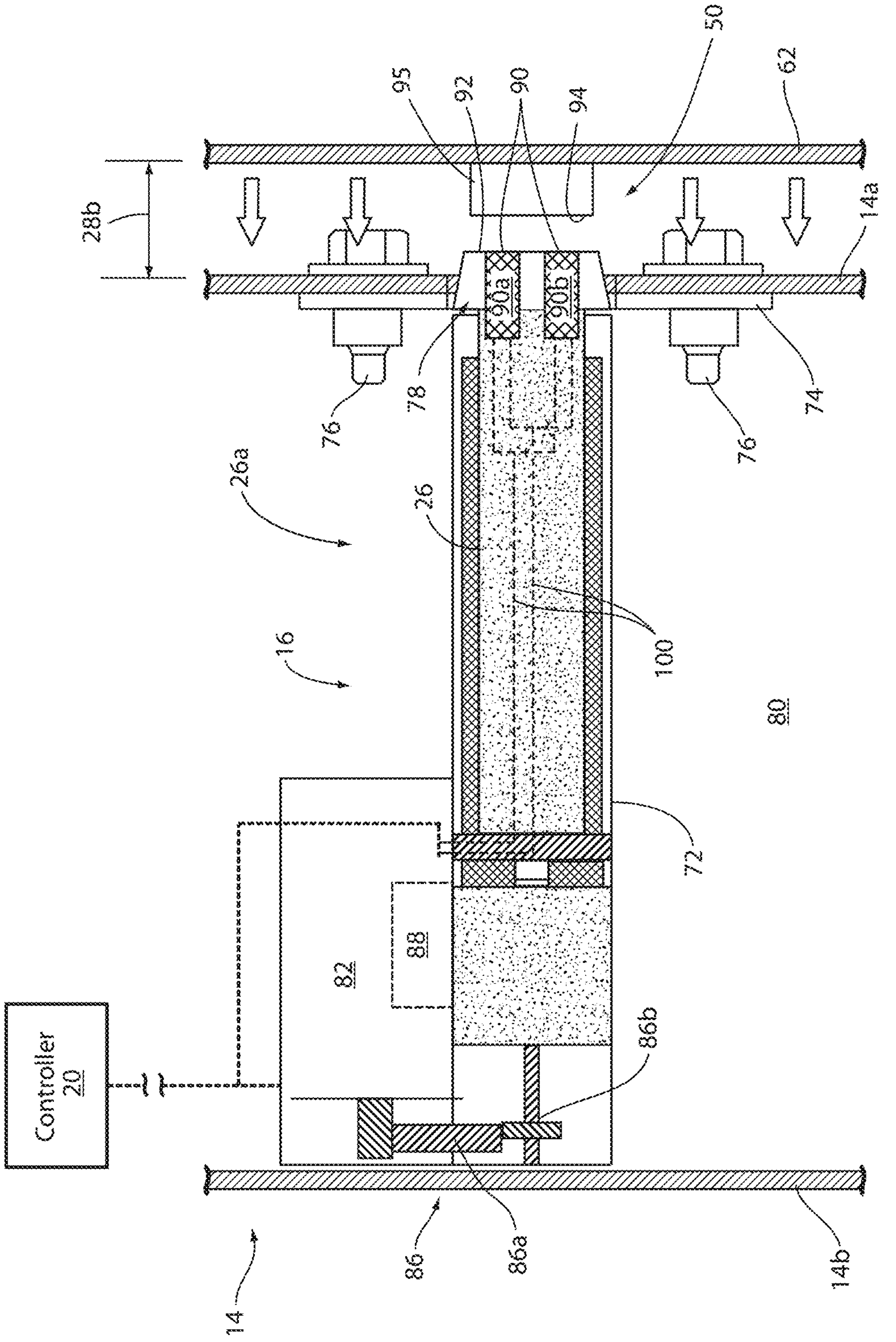
FIG. 6 is a cross-sectional view of a powered door presenter mechanism showing a plunger in a retracted position.

The locator mechanism 16 may comprise an electric plunger motor 82 operably connected to the plunger 26 by a gear drive 86 or other suitable arrangement. In the illustrated example, the gear drive 86 comprises a rotating gear 86*a* that engages a rack 86*b* on the plunger 26. However, it will be understood that various gear drive arrangements may be utilized. The plunger 26 reciprocates between a retracted position 26*a* as shown in FIG. 6 and the extended position 26*b* as shown in FIG. 4. The controller 20 may be configured to control the electric motor 82. Though the electric motor 82 is discussed in reference to the exemplary embodiments, it shall be understood that a solenoid or other suitable powered actuator may be utilized instead of electric motor 82. For example, plunger 26 may be biased to an open or closed position by a spring, and a solenoid may be actuated to overcome the bias and shift plunger 26.

The locator mechanism 16 may further comprise one or more plunger position sensors 88. The plunger position sensors 88 may be in communication with the controller 20 and communicate signals to the controller 20 identifying a position of the plunger 26. The plunger position sensors 88 may comprise one or more Hall Effect sensors and/or micro switches. The Hall Effect sensors may provide vehicle-specific electrical current versus travel profiles that may be stored in a memory of the controller 20. This data may be used by controller 20 to identify (or learn) positions along a full travel range of the plunger 26.

As previously discussed, the door control system 10 may further comprise the retraction device 50 configured to retrieve and reposition the door 14 from the first ajar position 28*a* to a second ajar position 28*b*. In such embodiments, one or more electromagnets 90 may be incorporated in an end surface 92 of the plunger 26. In the exemplary embodiment, a first electromagnet 90*a* and a second electromagnet 90*b* may be disposed in an end portion of the plunger 26 proximate to the end surface 92. The electromagnets 90 may comprise conductive windings wrapped around a magnetically conductive or ferromagnetic material. In response to current applied by the controller 20, an electromagnetic field 98 of the electromagnets 90 may be selectively activated.

Figure 3:
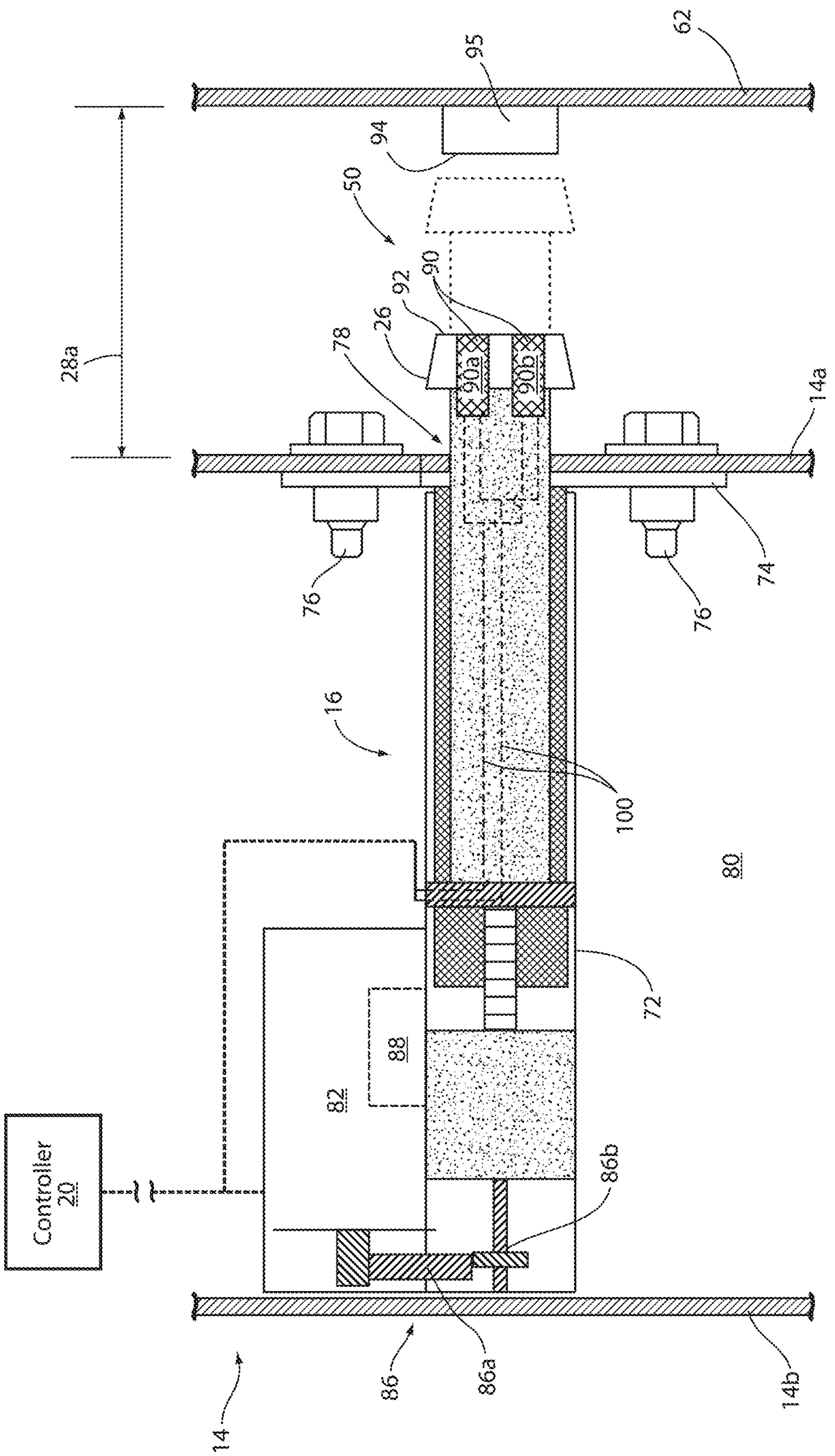
FIG. 3 is a cross-sectional view of a powered door presenter mechanism.

In operation, the controller 20 may control the plunger 26 to extend and contact an engaging surface 94 of a ferromagnetic element 95 of the vehicle 12 to position the door in the first ajar position 28*a*. As shown, the engaging surface 94 may be disposed in the door jamb 34 as shown in FIG. 3. Additionally, the door control system 10 may be configured to selectively activate the retraction device 50 (e.g. the electromagnet) to attract a distal end 96 of the plunger 26 to the engagement surface 94. One activated, an electromagnetic field 98 generated by the retraction device 50 may magnetically connect the end surface 92 to the engaging surface 94 as shown in FIG. 4. Once magnetically connected, the controller 20 may control the electric plunger motor 82 to retract the plunger 26 resulting in the door 14 being positioned in the second ajar position 28*b* as shown in FIG. 5.

The door 14 is shown in the first ajar position 28*a* in FIG. 1. As demonstrated in FIG. 1, the first ajar position 28*a* may provide for the gap 30 formed between the inner side 14*a* of the door 14 and the body 62 of the vehicle 12. The gap 30 may preferably be large enough to allow a user 38 to insert a hand 38*a* into the gap 30. The gap 30 may be at least about 20 mm and, in some embodiments, may be at least about 50 mm. In general, the gap 30 may be in a range of about 20 mm to about 250 mm. Also, the travel of plunger 26 is approximately equal to the gap 30. The interior space 80 formed by the door 14 may be limited in the present configuration. However, the locator mechanism 16 may include a solenoid or other powered mechanism rather than an electric motor 82, which may be applied to adjust a travel of the plunger 26. Furthermore, it will be understood that plunger 26 could have other configurations, and the present invention is not limited to the specific linear plunger configuration shown and described above.

Referring again to the retraction device 50, the controller 20 may selectively activate the electromagnets 90 by applying current from a power supply to conductive wires 100. The conductive wires 100 may be conductively connected to windings, which may be wrapped around a ferromagnetic material forming the electromagnets 90. In this configuration, the controller 20 may selectively activate the electromagnetic field 98 connecting the end surface 92 to the ferromagnetic engagement surface 94. The magnetic attraction force generated by the electromagnetic field 98 may be sufficient to overcome the retaining force of the check mechanism 58 holding the door 14 in the first ajar position 28*a*. Accordingly, once the motor 82 retracts the plunger 26 from the extended position 26*b* to the retracted position 26*a*, the force applied by the motor 82 may overcome the retaining force of the check mechanism 58 such that the door is rotated about the hinge assembly 56 from the first ajar position 28*a* to the second ajar position 28*b*.

Figure 5:
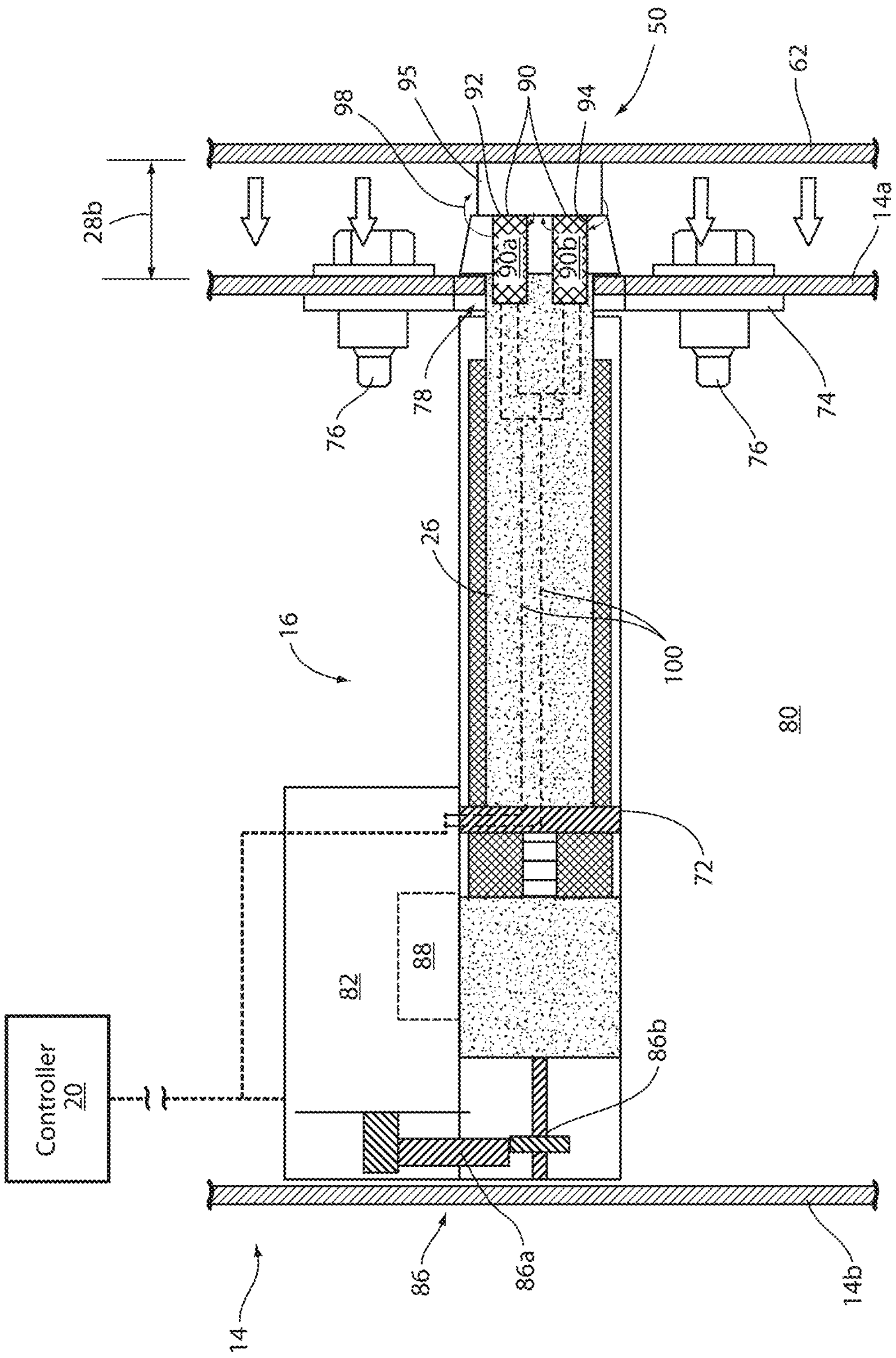
FIG. 5 is a cross-sectional view of a powered door presenter mechanism.

During the retraction process, the motor 82 may retract the plunger 26 into the interior space 80 until the door 14 is located in the second ajar position 28*b* as shown in FIG. 5. The controller 20 may monitor the angular position sensor 60 and the plunger position sensors 88 to determine if the angular orientation of the door 14 is changing in response to the motion of the plunger 26. For example, during the retraction process, the controller 20 may compare the change in the angular orientation of the door 14 to the positional change of the plunger 26. If the retraction device 50 is operating properly (e.g. the electromagnetic force is sufficient to bind the end surface 92 of the plunger 26 to the engaging surface 94), the controller 20 may detect that the movement of the plunger 26 reported by the plunger position sensors 88 is commensurate to the change in the angular orientation of the door 14 in response to the motion of the plunger 26. If the controller detects that the angular sensor 60 for the door 14 and position sensor 88 for the plunger 26 differs from a predetermined comparative position, the controller 20 may identify that the door is obstructed and/or the magnetic connection of the retraction device 50 has been overcome, allowing the end surface 92 of the plunger to become disconnected from the engaging surface 94. In this way, controller 20 may control and monitor the positioning of the door 14 to ensure accurate and effective operation.

Figure 7:
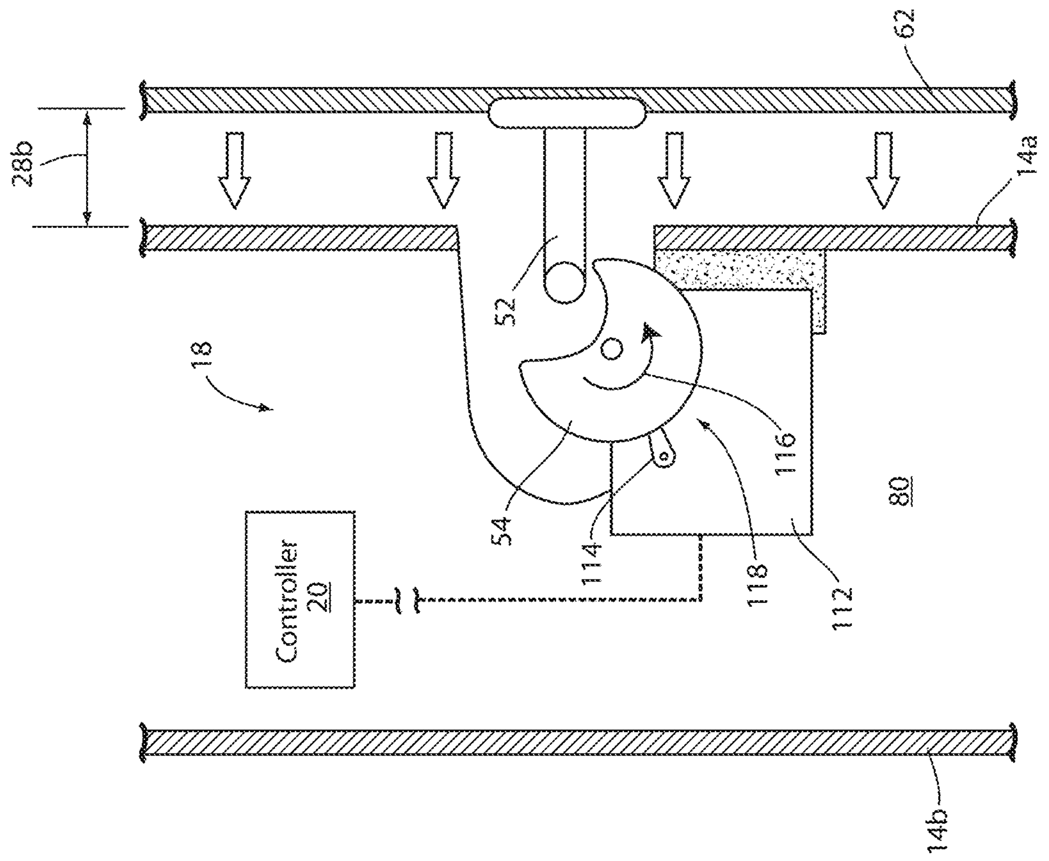
FIG. 7 is a schematic view of a powered latch mechanism.
Figure 8:
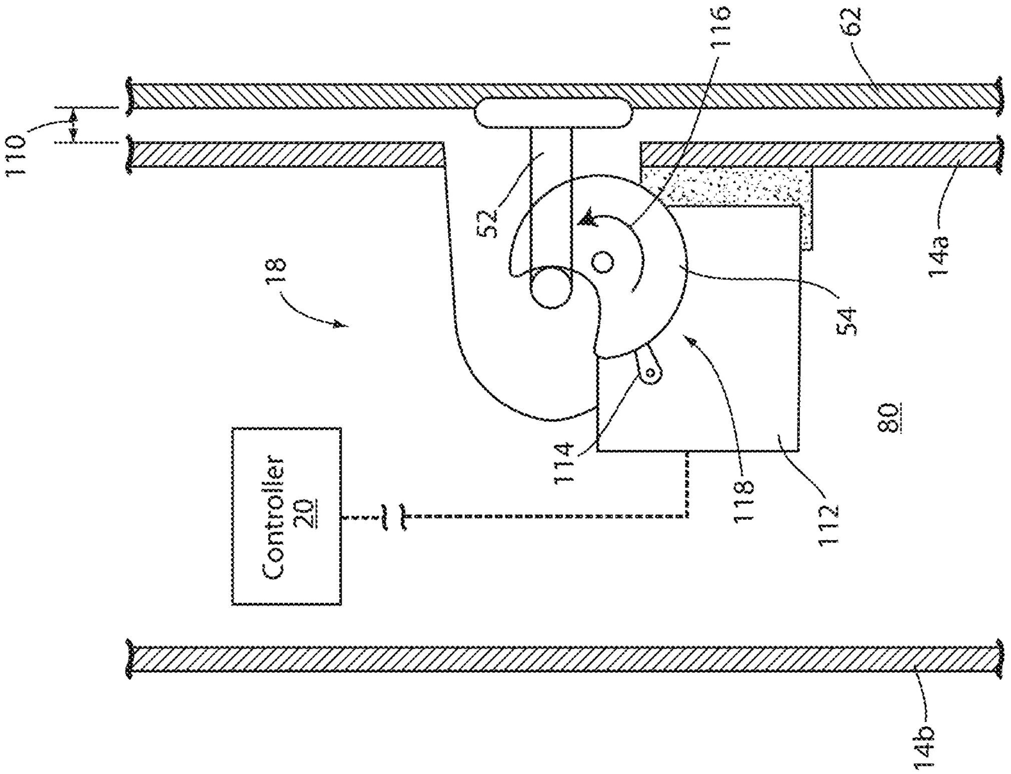
FIG. 8 is a schematic view of a powered latch mechanism.

Referring now to FIGS. 7 and 8, the operation of an exemplary embodiment of the powered latch mechanism 18 is described in further detail. In operation, the controller 20 may monitor the motion of the door 14 and the plunger 26 via the angular sensor 60 and position sensor 88 until the door is positioned in the second ajar position 28*b*. Once the door 14 is retracted from the first ajar position 28*a* to the second ajar position 28*b*, the controller 20 may activate the powered latch mechanism 18 to secure the door 14 in a closed position 110 or sealed position. The powered latch mechanism 18 comprises a latch motor 112 in communication with the controller 20 and configured to mechanically rotate the cinching plate 54. In this way, the controller 20 may selectively activate the powered latch mechanism 18 to secure the door 14 in the closed position 110 by controlling the latch motor 112 to rotate the cinching plate 54 to rotatably engage the bar 52.

To lock the cinching plate 54, the latch mechanism 18 may comprise a pawl 114. The pawl 114 may be positioned via biased by a spring, or the like (not shown), in the direction of the arrow 116. In this configuration, the pawl 114 may maintain the rotation of the cinching plate 54 in the direction of the arrow 116. In order to release the bar 52, the latch motor 112 may be operably connected to the pawl 114 to rotate the pawl 114 to a disengaged or unlatched position. Accordingly, the controller 20 can unlatch latch mechanism 18 by reversing the direction of the latch motor 112 to release the pawl 114 to rotate the cinching plate 54 in a direction opposite the arrow 116. Additionally, in some embodiments, a mechanical actuator may be in connection to the pawl 114 and a drive assembly 118 of the latch motor 112. The mechanical actuator may be in connection with an interior or exterior access handle of the vehicle configured to release the latch mechanism 18 such that the door 14 may rotate about the hinge assembly 56.

Figure 9:
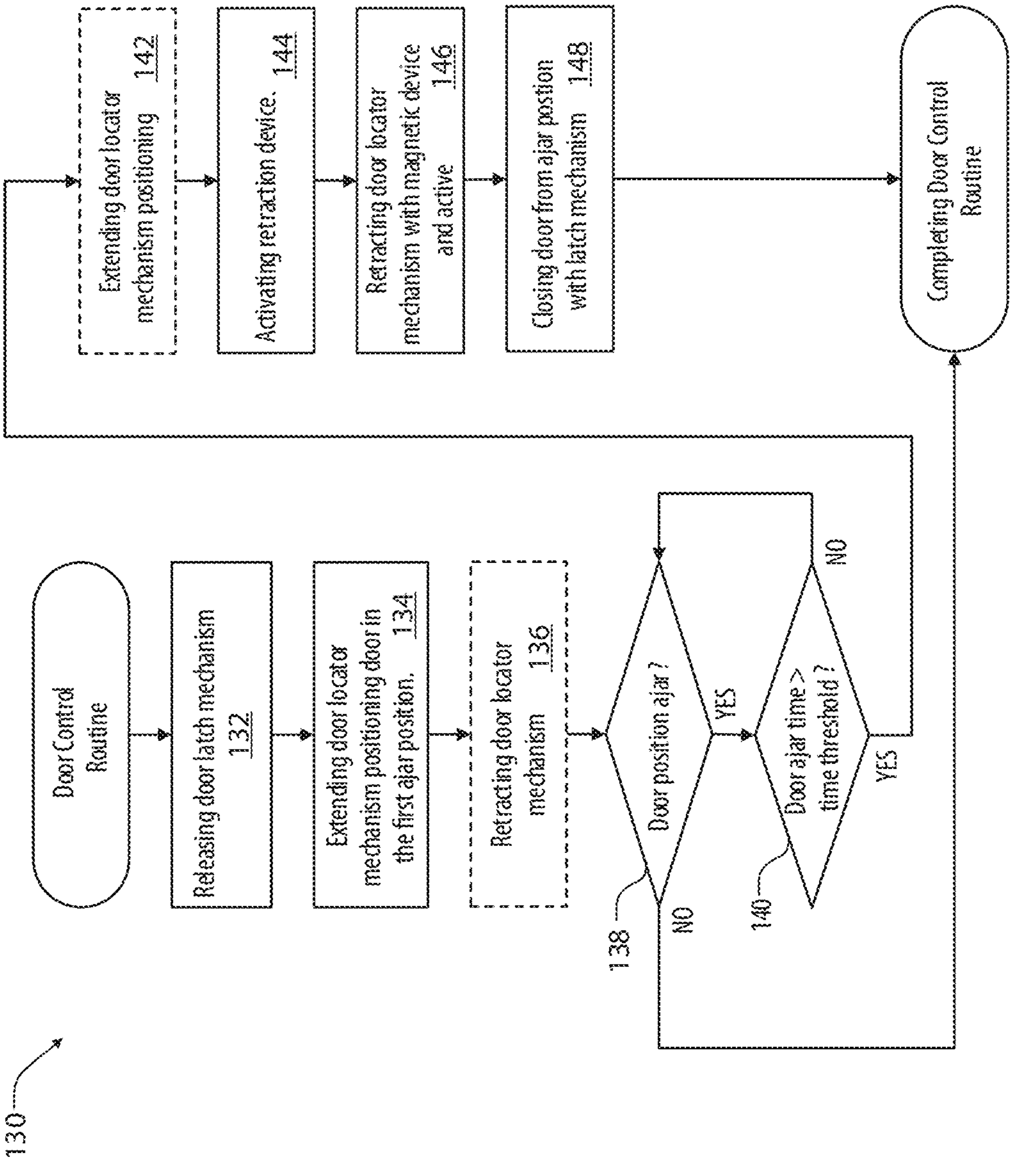
FIG. 9 is a flowchart showing operation of a powered door latch and powered door presenter.

Referring now to FIG. 9, a flowchart is shown describing a method 130 for controlling the system 10. The method 130 may begin in response to the controller 20 receiving an input signal from the control switch 22 or the remote control device 24 (e.g. a key fob, mobile device, etc.). In response to the input signal, the controller 20 may control the latch motor 112 to release the bar 52 by rotating the cinching plate 54 (132). Once the cinching plate 54 has released the bar 52, the controller 20 may control the plunger motor 82 to extend the plunger 26 from the retracted position 26*a* to the extended position 26*b* (134). Once the plunger 26 is extended to the extended position 26*b*, the angular position of the door 14 about the hinge assembly 56 may be held in the first ajar position 28*a* due to the bias force applied to the door 14 by the check mechanism 58. Upon positioning the door in the first ajar position 28*a*, the controller 20 may optionally retract the plunger 26 of the locator mechanism 16 (136).

The controller 20 may monitor a door ajar time elapsed once the door 14 is arranged in the first ajar position 28*a*. For example, based on the angular position sensor 60, the controller 20 may identify that the door is located in the first ajar position 28*a* (138). If the door is located in the first ajar position 28*a* or a similar ajar position, the controller 20 may compare the door ajar time to a predetermined time threshold (140). If the door 14 is manually closed prior to the door ajar time exceeding the time threshold, the control routine may be completed. However, if the door 14 remains ajar in excess of the time threshold, the controller 20 may control the door control system 10 to return the door 14 to the closed position 110.

The controller 20 may control the position of the door 14 by first extending the locator mechanism 16 if previously retracted in step 136 (142). Once the plunger 26 of the locator mechanism 16 is positioned in the extended position 26*b*, the electromagnets 90 of the retraction device 50 may be positioned proximate the engagement surface 94, and the controller 20 may activate the retraction device 50 (144). When activated, the magnetic attraction force generated by the electromagnetic field 98 may magnetically join the end surface 92 to the engagement surface 94. The controller 20 may then retract the plunger 26 of the door locator 16 to move the door 14 from the first ajar position 28*a* to the second ajar position 28*b* (146). Once the door is located in the second ajar position 28*b*, the controller 20 may control the powered latch mechanism 18 to drive the cinching plate 54 such that the door is returned to the closed position 110 (148). Once the door is located in the closed position, the method 130 may be completed.

As previously discussed, throughout operation of the door control system 10 in the method 130, the controller 20 may monitor the angular position of the door 14 and the position of the plunger 26. For example, the controller 20 may monitor signals from the angular position sensor 60 and the plunger position sensors 88 to determine if the angular orientation of the door 14 is changing in response to each of the steps described herein. For example, the controller may identify improper operation of the door locator 16 or the retraction device 50 by monitoring the angular position of the door 14 and the position of the plunger 26 to ensure that the corresponding positions indicate that the door end surface 92 of the plunger 26 is in contact with the engaging surface 94 of the body 62. Accordingly, the controller 20 may detect that a fault has occurred in the door control routine based on the positional data communicated by the sensors 60 and 88.

Referring now to FIG. 10, a block diagram of the door control system 10 is shown. As previously discussed, the system 10 may be configured to control a door control routine for a plurality of doors 14. Accordingly, the door control system 10 may comprise a controller 20 configured to control each of the plurality of doors 14. In an exemplary embodiment, the plurality of doors 14 may comprise a driver's side front door, a passenger side front door, a driver's side rear door, and a rear passenger side door. Though four doors are discussed in reference to the exemplary embodiment, the system 10 may be scaled for a variety of applications with various numbers of doors or access regions.

As previously discussed, each of the doors 14 may comprise a locator mechanism 16 and a latch mechanism 18. The locator mechanism 16 may comprise an electric plunger motor 82 operably connected to the plunger 26. The locator mechanism 16 may further comprise one or more plunger position sensors 88. The plunger position sensors 88 may be in communication with the controller 20 and communicate signals to the controller 20 identifying a position of the plunger 26. The plunger position sensors 88 may comprise one or more Hall Effect sensors and/or micro switches. The Hall Effect sensors may provide vehicle-specific electrical current versus travel profiles that may be stored in a memory (not shown) of the controller 20. This data may be used by controller 20 to identify (or learn) positions along a full travel range of the plunger 26.

The locator mechanism 16 may further comprise the retraction device 50. The controller 20 may selectively activate the electromagnets 90 of the retraction device 50 to retrieve and reposition each of the doors 14. The electromagnets 90 may be activated by the controller 20 by supplying current to one or more electromagnetic coils forming the electromagnets 90. In this way, the locator mechanism 16 may be operable to reposition the doors 14 in an opening configuration and a closing configuration.

The controllers 20 may also be in communication with an angular position sensor 60 (e.g. a Hall Effect sensor, potentiometer, etc.) for each of the doors 14. The position sensor 60 may communicate a signal indicating the angular position of door 14 relative to body 62 of the vehicle 12. As discussed herein, the controller 20 may monitor and compare the signals from the angular position sensors 60 and the plunger position sensors 88 during the control routine for the doors 14. In this way, the controller 20 may identify a positioning error or fault.

The latch mechanism 18 may be configured to secure each of the doors 14 in a closed position 110 or sealed position. The powered latch mechanism 18 may comprise a latch motor 112 in communication with the controller 20 and configured to mechanically rotate the cinching plate 54. In operation, the cinching plate 54 may engage a bar such that the door is repositioned from the second ajar position 28*b* for the closed position 110 as the cinching plate 54 draws the door 14 closer to the body 62 of the vehicle 12. In this way, the controller 20 may selectively activate the powered latch mechanism 18 to secure each of the doors 14 in the closed position 110.

The controllers 20 for each of the doors 14 may correspond to programmable controllers, but more generally may comprise electrical circuits that are configured to provide the desired operating logic. In an exemplary embodiment, each of the controllers 20 may be in communication via a data network 150. The data network 150 may comprise a Controller Area Network (CAN) Bus that operates according to one or more industry standards. The data network 150 may be configured to data communication among the controllers 20 and one or more vehicle control modules 160. The vehicle control modules 160 may comprise a Restraint Control Module ("RCM"), a Powertrain Control Module ("PCM"), and a Body Control Module ("BCM"). The data network 150 may also be in communication with an Instrument Panel Cluster ("IPC") configured to communicate various statuses of systems of the vehicle 12.

The RCM may utilize data from one or more acceleration sensors to determine if a collision event has occurred. Accordingly, in response to a collision, the RCM may be configured to deploy passenger restraints and/or turn off a vehicle's fuel supply in the event a collision is detected. The BCM may be operably interconnected to sensors (not shown) that signal the control module 160 if the vehicle doors are ajar. Each of the control modules and systems discussed herein may be connected to a main vehicle electrical power supply, such as a battery. The door control system 10 may also include backup power supplies that may be utilized to actuate the locator mechanism 16 and the latch mechanism in the event the power supply from the main vehicle power supply is interrupted or lost. The backup power supplies may comprise capacitors, batteries, or other electrical energy storage devices.

In some embodiments, the door control system 10 may further be in communication with a wireless communication circuit 162. The wireless communication circuit 162 may be incorporated or in communication with the system 10 via the vehicle control module 160. The wireless communication circuit 162 may be configured to receive and communicate one or more access codes or signals to a remote control device 24 (e.g. a key fob, mobile device, etc.). In this way, the user 38 may utilize an interface of the remote control device 24 to wirelessly communicate with the door control system 10 to initiate the control routine. The wireless communication circuit 162 may comprise a transceiver or receiver configured to communicate via a variety of wireless communication protocols. Some exemplary protocols may include, but are not limited to, Wi-Fi™, 3G, 4G, HSDPA, LTE, RF, NFC, IEEE 802.11 a, b, g, n, ac, or ad, Bluetooth®, BLE, WiMAX, ZigBee®, etc. Accordingly, the system be configured to suit a variety of applications to activate the various operations of the system discussed herein.

In one aspect of the present disclosure, an apparatus for positioning a vehicle door apparatus is disclosed. The apparatus comprises a door configured to be pivotably mounted to a body structure of a vehicle and a door locator mechanism. The door locator mechanism comprises a plunger and a retraction device. The plunger is configured to be actuated between extended and retracted positions. The retraction device is disposed on the plunger and configured to engage the body structure magnetically. The apparatus further comprises a controller configured to withdraw the plunger to the retracted position while activating the retraction device electromagnetically connecting the plunger to the door.

Embodiments of the this aspect of the disclosure can include any one or a combination of the following features:

the retraction device comprises an electromagnetic device;

the electromagnetic device is disposed in an end portion of the plunger;

the door is pivotably mounted to the body structure via a hinge assembly at a proximal end portion and the door locator is disposed in a distal end portion of the door;

a powered latch mechanism disposed on the distal end portion of the door opposite the hinge assembly;

the controller is further configured to:

control the powered latch mechanism engaging a bolt connected to the vehicle body thereby closing the door from an at least partially ajar position;

the door locator is disposed inside the door and is configured to extend the plunger outward from the door toward the body structure of the vehicle;

an engaging surface disposed on the body structure, wherein an end surface of the plunger is configured to contact the engaging surface of the vehicle body;

the engaging surface is of a ferromagnetic metal;

the controller is further configured to:

activate the electromagnet when the plunger is in the extended position connecting the engaging surface to the end surface; and the controller is further configured to:

retract the plunger to a retracted position with the electromagnet activated thereby at least partially closing the door.

In another aspect of the present disclosure, a method for controlling a position of a vehicle door is disclosed. The method comprises rotating a door about a hinge assembly and extending a plunger from the door toward a body structure of the vehicle. The method further comprises activating an electromagnetic mechanism disposed on an end portion of the plunger magnetically connecting the plunger to the body structure. With the end portion magnetically connected to the body structure, the method continues by drawing the door toward the body structure by retracting the plunger thereby at least partially closing the vehicle door.

Embodiments of the this aspect of the method can include any one or a combination of the following features:

releasing a latch from a bar in connection with the body structure, thereby releasing the door to rotate about the hinge assembly;

the extending the plunger from the door toward the body structure comprises pressing an end portion of the plunger against an engaging surface of the body structure;

pressing the end portion of the plunger against the engaging surface rotates the door about the hinge assembly locating the door in a first ajar position;

a proximal end portion of the door is in connection with the hinge assembly and the plunger extends from a distal end portion of the door; and extending the plunger comprises controlling a motor engaging a gear assembly driving the plunger out from inside the door.

In yet another aspect of the present disclosure, an apparatus for positioning a vehicle door is disclosed. The apparatus comprises a door comprising a proximal end portion and a distal end portion. The door is pivotably mounted to a body structure of a vehicle at the proximal end portion. The apparatus further comprises a door locator mechanism. The door locator mechanism comprises a plunger configured to be actuated between extended and retracted positions and a retraction device disposed on the plunger. The retraction device is configured to engage the body structure magnetically. The apparatus further comprises a powered latch mechanism disposed on the distal end portion of the door opposite the hinge assembly and a controller. The controller is configured to activate the retraction device electromagnetically connecting the plunger to the door and withdraw the plunger from the extended position to the retracted position while the retraction device is activated thereby closing the door to an at least partially ajar position. The controller is further configured to control the powered latch mechanism engaging a bolt connected to the body structure thereby closing the door from the at least partially ajar position.

Embodiments of the this aspect of the disclosure can include any one or a combination of the following features:

the retraction device comprises an electromagnetic device disposed in an end portion of the plunger; and an engaging surface of ferromagnetic material disposed on the body structure, wherein an end portion of plunger is configured to contact the engaging surface of the vehicle body.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An apparatus comprising:
- a door configured to be pivotably mounted to a body structure of a vehicle;
- a door locator mechanism in connection with a first portion of at least one of the door and the body structure comprising:
  - a plunger configured to be actuated between extended and retracted positions; and
  - a retraction device disposed on the plunger and configured to engage a second portion of at least one of the door and the body structure magnetically; and
- a controller configured to withdraw the plunger to the retracted position while activating the retraction device electromagnetically connecting the plunger to the second portion of at least one of the door and the body structure.

2. The apparatus according to claim 1, wherein the retraction device comprises an electromagnetic device.

3. The apparatus according to claim 1, wherein the electromagnetic device is disposed in an end portion of the plunger.

4. The apparatus according to claim 1, wherein the door is pivotably mounted to the body structure via a hinge assembly at a proximal end portion and the first portion comprises one of a distal end portion of the door and a pillar of the body structure.

5. The apparatus according to claim 4, further comprising a powered latch mechanism disposed on a third portion of at least one of the distal end portion of the door and the pillar of the body structure opposite the hinge assembly.

6. The apparatus according to claim 5, wherein the controller is further configured to:
- control the powered latch mechanism engaging a bolt connected to a fourth portion of at least one of the distal end portion of the door and the pillar of the body structure thereby closing the door from an at least partially ajar position.

7. The apparatus according to claim 1, wherein the door locator is disposed inside one of the door and the body structure and is configured to extend the plunger between the door and the body structure of the vehicle.

8. The apparatus according to claim 1, further comprising:
- an engaging surface disposed on the second portion, wherein an end surface of the plunger is configured to contact the engaging surface.

9. The apparatus according to claim 8, wherein the engaging surface is of a ferromagnetic metal.

10. The apparatus according to claim 9, wherein the controller is further configured to:
- activate the electromagnet when the plunger is in the extended position connecting the engaging surface to the end surface.

11. The apparatus according to claim 10, wherein the controller is further configured to:
- retract the plunger to a retracted position with the electromagnet activated, thereby at least partially closing the door.

12. A method for controlling a position of a vehicle door comprising:
- rotating the door about a hinge assembly;
- extending a plunger from a first portion of at least one of the door and a body structure of the vehicle;
- activating an electromagnetic mechanism disposed on an end portion of the plunger magnetically connecting the plunger to a second portion of at least one of the door and the body structure; and
- drawing the door toward the body structure by retracting the plunger.

13. The method according to claim 12, further comprising:
- releasing a latch from a bar in connection with a third portion of at least one of the door and the body structure, thereby releasing the door to rotate about the hinge assembly.

14. The method according to claim 12, wherein extending the plunger from the first portion comprises pressing an end portion of the plunger against an engaging surface of the second portion.

15. The method according to claim 14, wherein pressing the end portion of the plunger against the engaging surface rotates the door about the hinge assembly locating the door in a first ajar position.

16. The method according to claim 12, wherein a proximal end portion of the door is in connection with the hinge assembly and the first portion comprises at least one of a pillar of the body structure and a distal end portion of the door.

17. The method according to claim 12, wherein extending the plunger comprises controlling a motor engaging a gear assembly driving the plunger out from inside at least one of the door and the body structure.

18. An apparatus comprising:
- a door comprising a proximal end portion and a distal end portion, wherein the door is pivotably mounted to a body structure of a vehicle at the proximal end portion;
- a door locator mechanism in connection with a first portion of at least one of the door and the body structure comprising:
  - a plunger configured to be actuated between extended and retracted positions; and
  - a retraction device disposed on the plunger and configured to engage a second portion of at least one of the door and the body structure;
- a powered latch mechanism disposed on a third portion of at least one of the door and the body structure; and
- a controller configured to:
  - activate the retraction device electromagnetically connecting the plunger to the second portion;
  - withdraw the plunger from the extended position to the retracted position while the retraction device is activated, thereby closing the door to an at least partially ajar position; and
  - control the powered latch mechanism engaging a bolt connected to a fourth portion of at least one of the door and the body structure, thereby closing the door from the at least partially ajar position.

19. The apparatus according to claim 18, wherein the retraction device comprises an electromagnetic device disposed in an end portion of the plunger.

20. The apparatus according to claim 19, further comprising:

an engaging surface of ferromagnetic material disposed on the second portion, wherein an end portion of the plunger is configured to contact the engaging surface.

* * * * *